United States Patent
Kim et al.

(10) Patent No.: US 8,872,368 B1
(45) Date of Patent: Oct. 28, 2014

(54) POWER GENERATING SYSTEM USING WASTING ENERGY FROM MOVING OBJECTS

(71) Applicant: K-Technology USA, Inc., Los Angeles, CA (US)

(72) Inventors: Ki Il Kim, Los Angeles, CA (US); Young Kim, Los Angeles, CA (US); Sarah Duncanson, Toluca Lake, CA (US)

(73) Assignee: K-Technology USA, Inc., Los Angeles, CA (US)

( * ) Notice: Subject to any disclaimer, the term of this patent is extended or adjusted under 35 U.S.C. 154(b) by 0 days.

(21) Appl. No.: 14/219,840

(22) Filed: Mar. 19, 2014

Related U.S. Application Data

(63) Continuation-in-part of application No. 14/084,234, filed on Nov. 19, 2013.

(51) Int. Cl.
*B61D 43/00* (2006.01)
*F02B 63/04* (2006.01)

(52) U.S. Cl.
USPC .............................................. 290/3; 290/1 C

(58) Field of Classification Search
USPC ...................................... 290/1 C, 3
See application file for complete search history.

(56) References Cited

U.S. PATENT DOCUMENTS

| | | | |
|---|---|---|---|
| 1,537,071 A * | 5/1925 | Farley | 105/110 |
| 1,985,679 A * | 12/1934 | Jenkins | 322/6 |
| 2,026,076 A * | 12/1935 | Spicer | 105/131 |
| 2,032,112 A * | 2/1936 | Brecht | 105/105 |
| 2,053,419 A * | 9/1936 | Brecht | 184/13.1 |
| 2,053,983 A * | 9/1936 | Whitsitt | 105/101 |
| 2,624,870 A * | 1/1953 | Kolanda et al. | 322/6 |
| 3,556,239 A * | 1/1971 | Spahn | 180/65.25 |
| 3,559,724 A * | 2/1971 | Wilkinson | 165/259 |
| 3,575,562 A * | 4/1971 | Remke | 200/80 R |
| 3,584,214 A * | 6/1971 | Peterson | 303/135 |
| 3,608,925 A * | 9/1971 | Murphy | 280/5.51 |
| 4,021,677 A * | 5/1977 | Rosen et al. | 290/40 R |
| 4,246,988 A * | 1/1981 | Hoppie | 477/188 |
| 4,314,160 A * | 2/1982 | Boodman et al. | 290/55 |
| 4,351,405 A * | 9/1982 | Fields et al. | 180/65.225 |
| 4,405,028 A * | 9/1983 | Price | 180/65.7 |
| 4,405,872 A | 9/1983 | Thomas | |
| 4,414,462 A * | 11/1983 | Price | 219/202 |
| 4,457,237 A * | 7/1984 | Theurer et al. | 105/61 |
| 4,684,817 A * | 8/1987 | Goldwater | 290/55 |
| 4,748,338 A * | 5/1988 | Boyce | 290/42 |
| 5,296,746 A * | 3/1994 | Burkhardt | 290/55 |
| 5,362,280 A * | 11/1994 | Hirai et al. | 474/135 |
| 5,566,795 A * | 10/1996 | Barefoot | 188/294 |
| 5,680,032 A * | 10/1997 | Pena | 290/52 |
| 5,921,334 A * | 7/1999 | Al-Dokhi | 180/2.2 |

(Continued)

*Primary Examiner* — Tulsidas C Patel
*Assistant Examiner* — Thomas Quigley
(74) *Attorney, Agent, or Firm* — Novick, Kim & Lee, PLLC; Jae Youn Kim

(57) ABSTRACT

Provided is a power generating system that includes at least one power generator connected to a first rotating shaft having at least one of a first gear, a first pulley, a first crankshaft, or a first eccentric shaft, the first rotating shaft connected to a second rotating shaft of at least one of a moving object or a rotating machine producing wasting mechanical energy and having at least one rotating wheel, the second rotating shaft having a second gear, a second pulley, a second crankshaft, or a second eccentric shaft.

12 Claims, 10 Drawing Sheets

(56) References Cited

U.S. PATENT DOCUMENTS

| | | | | |
|---|---|---|---|---|
| 5,927,094 A * | 7/1999 | Nickum | | 62/259.2 |
| 6,076,516 A * | 6/2000 | Tucker | | 126/21 A |
| 6,474,242 B1 * | 11/2002 | Baier | | 105/4.1 |
| 6,897,575 B1 * | 5/2005 | Yu | | 290/44 |
| 7,478,693 B1 | 1/2009 | Curtis | | 180/165 |
| 7,763,988 B1 * | 7/2010 | Dravis | | 290/1 R |
| 8,098,040 B1 * | 1/2012 | Botto | | 320/101 |
| 8,371,401 B1 * | 2/2013 | Illustrato | | 180/2.2 |
| 8,436,485 B1 * | 5/2013 | Smith | | 290/55 |
| 8,701,804 B1 * | 4/2014 | Antrobus | | 180/65.31 |
| 2002/0153178 A1 * | 10/2002 | Limonius | | 180/2.2 |
| 2002/0187033 A1 * | 12/2002 | Stahler, Sr. | | 414/622 |
| 2003/0209370 A1 * | 11/2003 | Maberry | | 180/2.2 |
| 2005/0046195 A1 * | 3/2005 | Kousoulis | | 290/44 |
| 2006/0047398 A1 * | 3/2006 | Abe et al. | | 701/69 |
| 2006/0213697 A1 * | 9/2006 | Sutherland | | 180/2.2 |
| 2006/0273596 A1 * | 12/2006 | Durbin | | 290/54 |
| 2007/0077967 A1 * | 4/2007 | Nicholls et al. | | 455/561 |
| 2008/0041643 A1 * | 2/2008 | Khalife | | 180/2.2 |
| 2008/0202825 A1 * | 8/2008 | Kerish | | 180/2.2 |
| 2008/0231052 A1 * | 9/2008 | Farmer | | 290/52 |
| 2008/0257614 A1 * | 10/2008 | Tabe | | 180/2.2 |
| 2008/0263731 A1 * | 10/2008 | Tabe | | 903/903 |
| 2009/0181609 A1 * | 7/2009 | Thomas | | 454/14 |
| 2009/0267348 A1 * | 10/2009 | Liebermann | | 290/45 |
| 2009/0301796 A1 * | 12/2009 | Wedderburn et al. | | 180/2.2 |
| 2009/0322099 A1 | 12/2009 | Labankoff | | |
| 2010/0087976 A1 * | 4/2010 | Aridome et al. | | 701/22 |
| 2010/0107994 A1 * | 5/2010 | Moriarty et al. | | 123/3 |
| 2010/0237627 A1 * | 9/2010 | Socolove et al. | | 290/55 |
| 2010/0270810 A1 * | 10/2010 | Liebermann | | 290/1 A |
| 2010/0315040 A1 * | 12/2010 | Sakurai | | 320/109 |
| 2011/0101698 A1 * | 5/2011 | Saluccio | | 290/55 |
| 2011/0156404 A1 * | 6/2011 | Haddad | | 290/55 |
| 2011/0162924 A1 * | 7/2011 | Laxhuber | | 188/2 R |
| 2011/0260470 A1 * | 10/2011 | Ahmadi | | 290/1 R |
| 2011/0266075 A1 * | 11/2011 | Guzelimian | | 180/2.2 |
| 2011/0309786 A1 * | 12/2011 | Hassan | | 320/101 |
| 2012/0125700 A1 * | 5/2012 | Bailey, Sr. | | 180/2.2 |
| 2012/0133314 A1 * | 5/2012 | Kozarekar et al. | | 318/473 |
| 2012/0169061 A1 * | 7/2012 | Lee et al. | | 290/55 |
| 2012/0286513 A1 * | 11/2012 | Marano | | 290/50 |
| 2012/0299526 A1 * | 11/2012 | Lambert | | 320/101 |
| 2012/0299527 A1 * | 11/2012 | Vo | | 320/101 |
| 2012/0330488 A1 * | 12/2012 | Sadler | | 701/22 |
| 2013/0026989 A1 * | 1/2013 | Gibbs et al. | | 320/116 |
| 2013/0043082 A1 * | 2/2013 | Tran | | 180/2.2 |
| 2013/0127393 A1 * | 5/2013 | Garcia | | 320/101 |
| 2013/0168962 A1 * | 7/2013 | Bruno | | 290/44 |
| 2013/0175954 A1 * | 7/2013 | Astigarraga et al. | | 318/376 |
| 2013/0175974 A1 * | 7/2013 | Bassham et al. | | 320/106 |
| 2013/0306389 A1 * | 11/2013 | Penev | | 180/165 |
| 2013/0314023 A1 * | 11/2013 | Collier | | 320/101 |
| 2014/0076641 A1 * | 3/2014 | Penev | | 180/2.2 |

\* cited by examiner

US 8,872,368 B1

POWER GENERATING SYSTEM USING WASTING ENERGY FROM MOVING OBJECTS

REFERENCES TO RELATED APPLICATION

This application is a Continuation-In Part application of U.S. patent application Ser. No. 14/084,234 filed on Nov. 19, 2013.

BACKGROUND OF THE INVENTION

1. Field of the Invention

One or more embodiments of the present invention relate to an air power mobile generator including an electric generator and a wind fan rotated by artificial wind produced by moving objects such as automobiles, ships, airplanes, trains, helicopters and the like.

2. Description of the Related Art

Many different kinds of wind mills have been used to generate electricity by capturing natural wind. In order to capture strong wind, there is a need to build a high wind tower with a huge fan at a certain place where strong wind blows. As such, the utility of the wind mills are limited, depend on natural wind, and are costly.

Further, FIG. 1 illustrates a triboelectric power generator 10 disclosed in U.S. patent application Ser. No. 14/076,646, which was filed on Nov. 11, 2013. The triboelectric power generator 10 includes a rotating cylinder 11 having a triboelectric material 12, a rotating shaft 13 connected to the rotating cylinder 11 and including a wind fan 14 connected to a front end of the rotating shaft 13 to rotate the rotating shaft 13 and rotating cylinder 11, a housing 15 for covering the rotating cylinder 11, a plurality of electrodes 16 attached to the housing 16 and disposed between the rotating cylinder 11 and the housing 15, in which the triboelectric material 12 is negatively charged and the electrode 16 is positively charged when the electrode 16 is in contact with the triboelectric material 12 during rotation of the rotating cylinder 11, thereby generating triboelectric charges that can be saved in a battery 18. This triboelectric power generator 10 uses triboelectric effects to generate electricity such that it might be deficient to be used to run a heavy vehicle requiring a high voltage power supply.

Therefore, there is a need to provide a power generator which can generate electricity not using naturally blowing wind like a wind mill which has a limited utility depending on the natural phenomena.

Further, U.S. Pat. No. 4,405,872 to Thomas describes an apparatus for generating electrical energy from the rotation of an automobile wheel. Thomas teaches using permanent magnets and wire coils installed inside the wheel and tire to generate electricity. Also, US Pub. No. 2009/0322099 describes a rotational generator using the rotational mechanical energy of rotating wheels, wherein the electricity is generated by magnets attached in the rotating wheels in a similar manner taught by Thomas. As such, these references can teach producing small amount of electricity by using magnets embedded in the wheels.

However, the prior art does not teach producing high amount of electricity by utilizing wasting mechanical energy of rotating wheels of moving objects such as automobiles, trains, airplanes, ships, helicopter and the like. Further, the prior art does not teach utilizing wasting mechanical energy of non-moving objects such as machines and equipment used in many different industries and assembly plants.

SUMMARY OF THE INVENTION

Aspects of the invention provide an air power generator system capable of generating electricity, not using naturally blowing wind, but using artificial wind produced when an object such as a car operated by mechanical or electrical power runs over a particular speed. An aspect of the present invention provide a power generating system using wasting mechanical energy of wheels of non-moving and moving objects including industrial machines and equipment, trains, automobiles, ships, helicopters, airplanes and so on to produce high voltage of electricity. Additional aspects will be set forth in part in the description which follows and, in part, will be apparent from the description, or may be learned by practice of the presented embodiments.

According to an aspect of the present invention, an air power generator system is provided. The generator system can include a rotating shaft, a fan and a power generator connected to the rotating shaft, wherein the system is configured to be installed in or outside a body of at least one of an automobile, an airplane, a ship, or a train, and configured to produce DC power by the generator rotated by wind power when at least one of the automobile, the airplane, the ship, or the train moves over 10 miles per hour, and wherein the produced DC power is used for recharging a battery or operating a device in the at least one of the automobile, the airplane, the ship, or the train.

According to an embodiment of the present invention, the generator system may further include a CPU configured to generate an alarm with respect to a charge level of the battery, to turn on a full charged signal light, or to control a DC/AC converter.

According to an embodiment of the present invention, the automobile may include a DC to AC converter configured to convert DC power generated by the power generator to AC power.

According to an embodiment of the present invention, the automobile may include a jack configured to receive a connector cable to transmit the AC power to an electric outlet installed in a house or a home electrical device.

According to an embodiment of the present invention, the fan may include at least one vertical fan or at least one horizontal fan attachable in front or both sides of the power generator.

According to an embodiment of the present invention, a helicopter including at least one air power generator system of the present invention can be provided, wherein the at least one air power generator may be located on at least one leg of the helicopter and may be installed vertically such that the fan faces upward a rotor of the helicopter to be rotated by wind produced by the rotor.

According to an aspect of the present invention, a second power generator system can be provide, the second power generator system including a rotating shaft including a jointer configured to receive a belt connected to a rotating machine, and a power generator connected to the rotating shaft, wherein the system is configured to be installed in or outside a body of at least one of an automobile, an airplane, a ship, a helicopter, a train or a machine, and configured to produce DC power by the power generator rotated by the rotating shaft using a wasting mechanical energy when at least one of the automobile, the airplane, the ship, the helicopter, the train or the machine is operated, and wherein the produced DC power is used for recharging a battery or operating a device in the at least one of the automobile, the airplane, the ship, the helicopter or the train.

According to an embodiment of the present invention, the second generator system can include a CPU configured to generate an alarm with respect to a charge level of the battery, to turn on a full charged signal light, to control a DC/AC converter, or to control a RPM speed of the rotating shaft.

According to an embodiment of the present invention, the automobile including the second power generator system may include a DC to AC converter configured to convert DC power generated by the power generator to AC power.

According to an embodiment of the present invention, the automobile including the second power generator system may further include a jack configured to receive a connector cable to transmit the AC power to an electric outlet installed in a house or a home electrical device.

According to another aspect of the present invention, a power generating system using wasting energy from moving objects is provided. The power generating system can include at least one power generator connected to a first rotating shaft having at least one of a first gear, a first pulley, a first crankshaft, or a first eccentric shaft, the first rotating shaft connected to a second rotating shaft of at least one of a moving object or a rotating machine producing wasting mechanical energy and having at least one rotating wheel, the second rotating shaft having a second gear, a second pulley, a second crankshaft, or a second eccentric shaft, wherein the moving object is at least one of an automobile, a bus, a train, a subway train, a high speed train, a ship, a submarine, an airplane, a helicopter, and a trailer, wherein the system is configured to be installed in or outside of a body of the moving object or the rotating machine, and configured to produce power by the at least one power generator rotated by the first rotating shaft using the wasting mechanical energy from the moving object or rotating machine when the moving object or the rotating machine is operated, and wherein the produced power is used for at least one of recharging a battery, operating the moving object or the rotating machine, and transmitting the power to a grid.

According to an embodiment of the present invention, the power generating system is configured to adjust a RPM of the first rotating shaft by a diameter or a size of the gear, the wheel, or the pulley.

According to an embodiment of the present invention, the power generating system further comprises a wind turbine or one or more fan blades connected to the first rotating shaft for producing power.

According to an embodiment of the present invention, one half of the one or more fan blades are configured and arranged to be rotated by wind power to rotate the at least one power generator, and another half of the one or more fan blades are configured and arranged to blow wind toward the at least one power generator so as to cool the at least one power generator.

According to an embodiment of the present invention, the power generating system of the present invention further comprises an output power jack configured to be connected to the grid.

According to an embodiment of the present invention, the power generating system further comprises one of a voltage regulator, a transformer, or a rectifier.

According to an embodiment of the present invention, the power generating system further comprises a belt for connecting the first pulley with the second pulley.

According to an embodiment of the present invention, the first and second gears are chain gears.

According to an embodiment of the present invention, the power generating system further comprises a chain for connecting the first gear with the second gear.

According to an embodiment of the present invention, the rotating wheel comprises at least one of a metal wheel, an automobile tire wheel, a plastic wheel or a bearing wheel.

According to an embodiment of the present invention, the first and second gears are figured to be directly engaged with each other.

According to an embodiment of the present invention, the first gear is a worm and the second gear is a worm wheel.

According to an embodiment of the present invention, the first and second gears are comprised of one of a bevel gear, a helical gear, or a spur gear.

According to an embodiment of the present invention, the power generating system further comprises one or more fan blades connected to the first rotating shaft for producing power, wherein at least one of the one or more fan blades includes a replaceable weight attached at one end of the at least one of the one or more fan blades for controlling the power generator system to increase the produced power.

According to another aspect of the present invention, a power generating system using wasting energy from moving objects is provided, which includes at least one power generator connected to a first rotating shaft having at least one of a first gear, a second pulley, a first crankshaft, or a first eccentric shaft, the first rotating shaft connected to a second rotating shaft of at least one of a moving object or a rotating machine producing wasting mechanical energy and having at least one of a rotating wheel, the second rotating shaft having a second gear, a second pulley, a second crankshaft, or a second eccentric shaft; and at least one of a vertical rotating fan or a horizontal rotating fan attached to the first rotating shaft and configured to cool the at least one generator or rotate the at least one generator for producing power, wherein the moving object is at least one of an automobile, a bus, a train, a subway train, a high speed train, a ship, a submarine, an airplane, a helicopter, and a trailer, wherein the system is configured to be installed in or outside of a body of the moving object or the rotating machine, and configured to produce power by the at least one power generator rotated by the first rotating shaft using the wasting mechanical energy from the moving object or rotating machine when the moving object or the rotating machine is operated, and wherein the produced power is used for at least one of recharging a battery, operating the moving object, operating the rotating machine or transmitting the power to a grid.

According to an embodiment of the present invention, a capacitor can be provided with the power generating system for storing power for use in the moving object.

BRIEF DESCRIPTION OF THE DRAWINGS

These and other aspects will become apparent and more readily appreciated from the following description of the embodiments, taken in conjunction with the accompanying drawings of which.

The features and advantages of the present invention will become more apparent from the detailed description set forth below when taken in conjunction with the drawings in which like reference numbers indicate identical or functionally similar elements.

DETAILED DESCRIPTION

Figure 1:
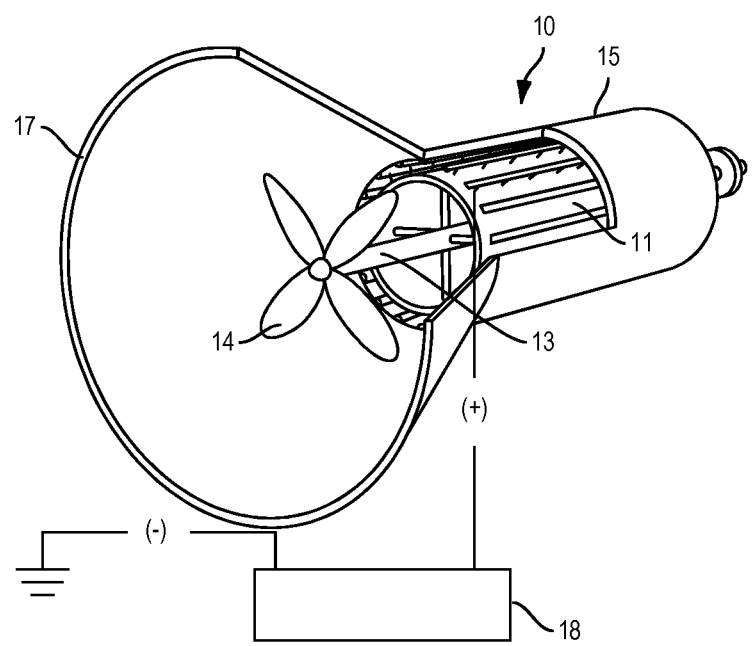
FIG. 1 is a perspective view of a triboelectric power generator in related art.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. Terms used herein are for descriptive purposes only and are not intended to limit the scope of the invention. The terms "comprises" and/or "comprising" are used to specify the presence of stated elements, steps, operations, and/or components, but do not preclude the presence or addition of one or more other elements, steps, operations, and/or components. The terms "first", "second", and the like may be used to describe various elements, but do not limit the elements. Such terms are only used to classify one element from another.

These and/or other aspects will become apparent and more readily appreciated from the following description of embodiments of the present invention, taken in conjunction with the accompanying drawing.

According to an aspect of the present invention, an air power mobile generator is provided. When every object moves in the air, artificial wind can be applied to the object, being produced by the friction between the air and the object. The present invention utilizes this wind produced by and applied to the moving object such as a car, an airplane, a train, a helicopter, a ship and the like. Even when a car runs 10 miles per hour, the wind produced by and applied to the car can be used to rotate a power generator of the present invention. Specially, a helicopter having a rotor can produce strong wind by the rotor which can be used to generate electricity by the air power mobile generator of the present invention to supply power to the helicopter or for other uses. As such, generating electricity by capturing the artificial wasting wind energy applied to the moving object, which is environmental friendly, is an aspect of the present invention.

Thus, the power generator of the present invention can be installed on the moving object, and the electricity generated by the present power generator can be used to run the object, or can be stored to a battery for later uses or to operate devices or equipment in the moving object. For example, the present power generator can be installed on a car such that the car may run for 5-6 hours, the car being charged by the power generator of the present invention, without charging the car battery.

Figure 2:
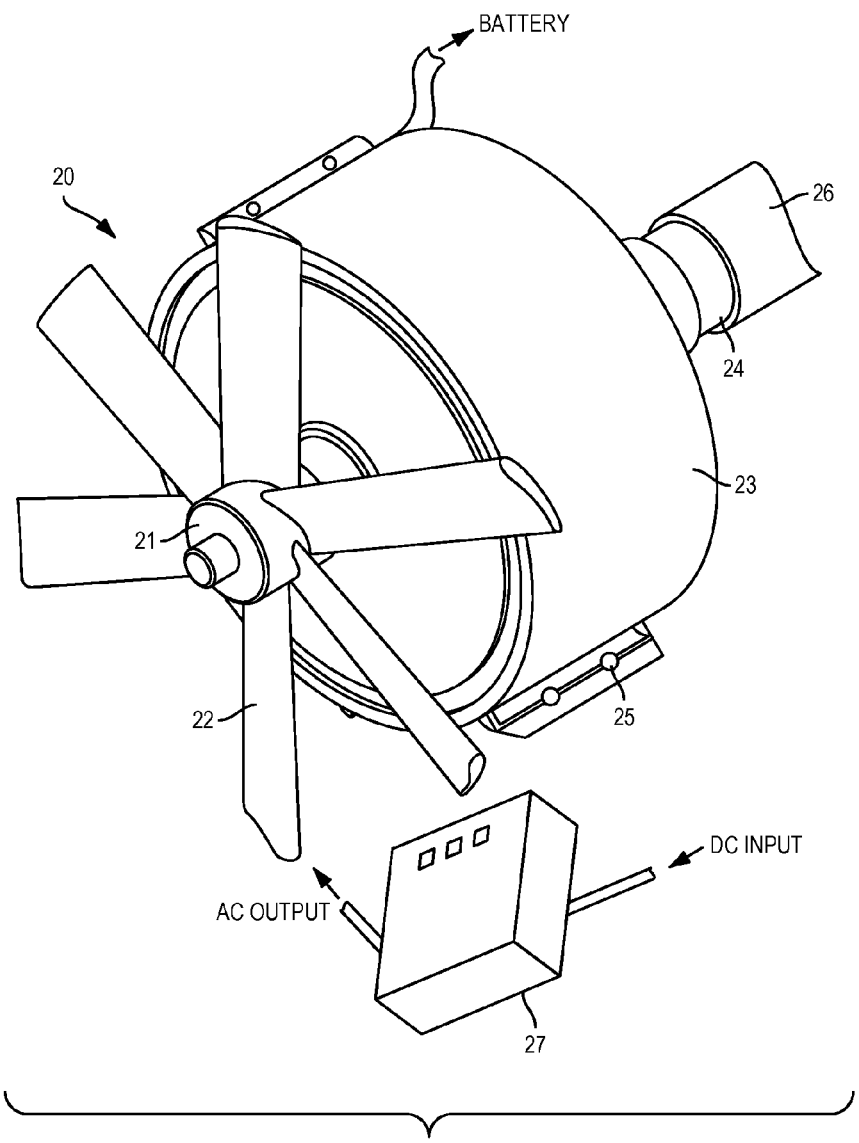
FIG. 2 is a perspective view of a power generator system of the present invention.

In particular, referring to FIG. 2, a power generator system 20 is provided. The power generator system 20 can include a rotating shaft 21, a fan 22 and a power generator 23 connected to the rotating shaft 21. The power generator system 20 may be configured to be installed in or outside a body of a moving object including an automobile, an airplane, a ship and a train, and further configured to produce DC power by the power generator 23 rotated by artificial wind power when the moving object moves over 10 miles per hour. Here, the produced DC power can be used for recharging a battery installed on the moving object or operating a device or equipment installed in the moving object. The power generator 23 can be conventional generators. For example, power generators manufactured by Sinoktech can be used in the power generator system 20. The output power of the power generator 23 can be 0.5 kW at 600 rpm, and can be from 3.5 kW to 5 kW at 200 rpm. Also, a wind turbine manufactured by Sinoktech may be used for the power generator 23. The wind turbine can generate from 0.5 kW to 10 kW electricity at 3 m/s wind speed, and the power generator 23 can be light in weight and small in size such that it can be used for automobiles for example.

According to another aspect of the present invention, the power generator system 20 can be rotated not by the artificial wind, but by a rotating device or machine installed in the moving object and operated by human, mechanical or electrical power of the moving object. In such a case, the power generator system 20 may or may not need the fan 22, and may include a connecting shaft 26 connecting the power generator 23 with the rotating device or machine in the moving object such that the power generator 23 can be rotated by the mechanical or electrical power to generate electricity. Further, the connecting shaft 26 may include a circular groove, recess or jointer 24 configured to receive a belt for connecting the connecting shaft 26 with the rotating device or machine in the moving object. Further, this embodiment of the power generator system 20 can include a CPU configured to generate an alarm with respect to a charge level of the battery, to turn on a full charged signal light, to control a DC/AC converter, or to control a RPM speed of the rotating shaft. As such, this power generator system 20 can be configured to be installed in or outside a body of an automobile, an airplane, a ship, a helicopter or a train, and configured to produce DC power by the power generator 23 rotated by the connecting shaft 26 using a wasting mechanical energy when the moving object is operated, and the produced DC power can be used for recharging a battery or operating any electrical device in the automobile, the airplane, the ship, the helicopter or the train.

According to an embodiment of the present invention, the power generator system 20 may include a battery to be charged by the electricity generated by the power generator 23. Further, the power generator system 20 can include a DC to AC converter 27 configured to convert DC power generated by the power generator 23 to AC power, and connected to the battery. The DC/AC converter 27 may have an input port connected to the battery and an output port for supplying AC power to home appliances or devices. Alternatively, the DC/AC converter 27 can be combined with the battery in a unit. Further, the power generator system 20 can include a CPU (not shown) configured to generate an alarm with respect to a charge level of the battery, to turn on a full charged signal light (not shown), or to control the DC/AC converter 27. Further, the power generator 23 may include bolt holes 25 for attaching it to the moving object.

Figure 3:
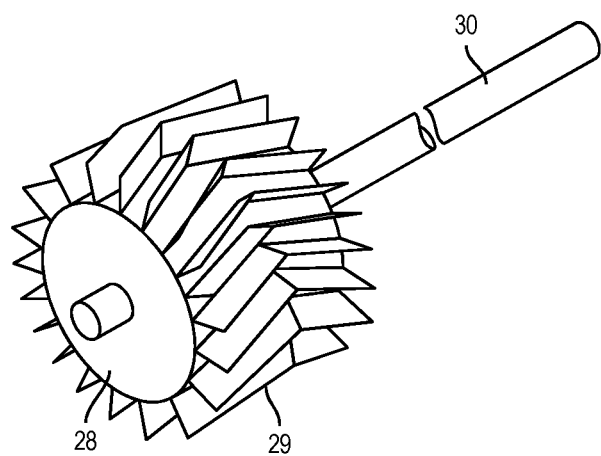
FIG. 3 is a perspective view of an embodiment of the wind fan of the generator system of the present invention.

Referring to FIGS. 2 and 3, according to an embodiment of the present invention, the fan 22 may include a vertical fan or a horizontal fan attachable in front or both sides of the power generator 23. The fan as shown in FIG. 3 can include a shaft 30 and blades 29 attached to a blade holder 28. The blades 29 can be any conventional shapes known in the art and vertically or horizontally arranged with the power generator 23.

Figure 4:
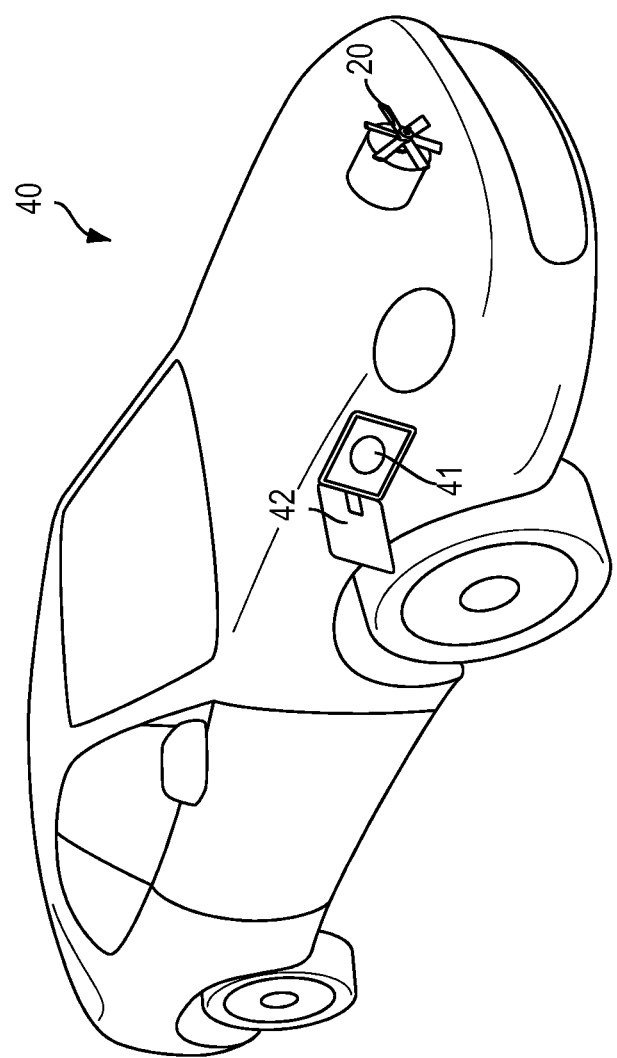
FIG. 4 is a perspective view of a car including the power generator system of the present invention.

Referring to FIG. 4, according to an embodiment of the present invention, an automobile 40 including the power generator system 20 is provided. The automobile 40 may include a jack 41 configured to receive a connector cable to transmit the AC power to an electric outlet installed in a house or a home electrical device, and a cover 42 for the jack 41. When there is power outage, the electricity generated by the power generator system 20 installed on the automobile 40 can be used for homes in emergencies by using the connector cable.

Figure 5:
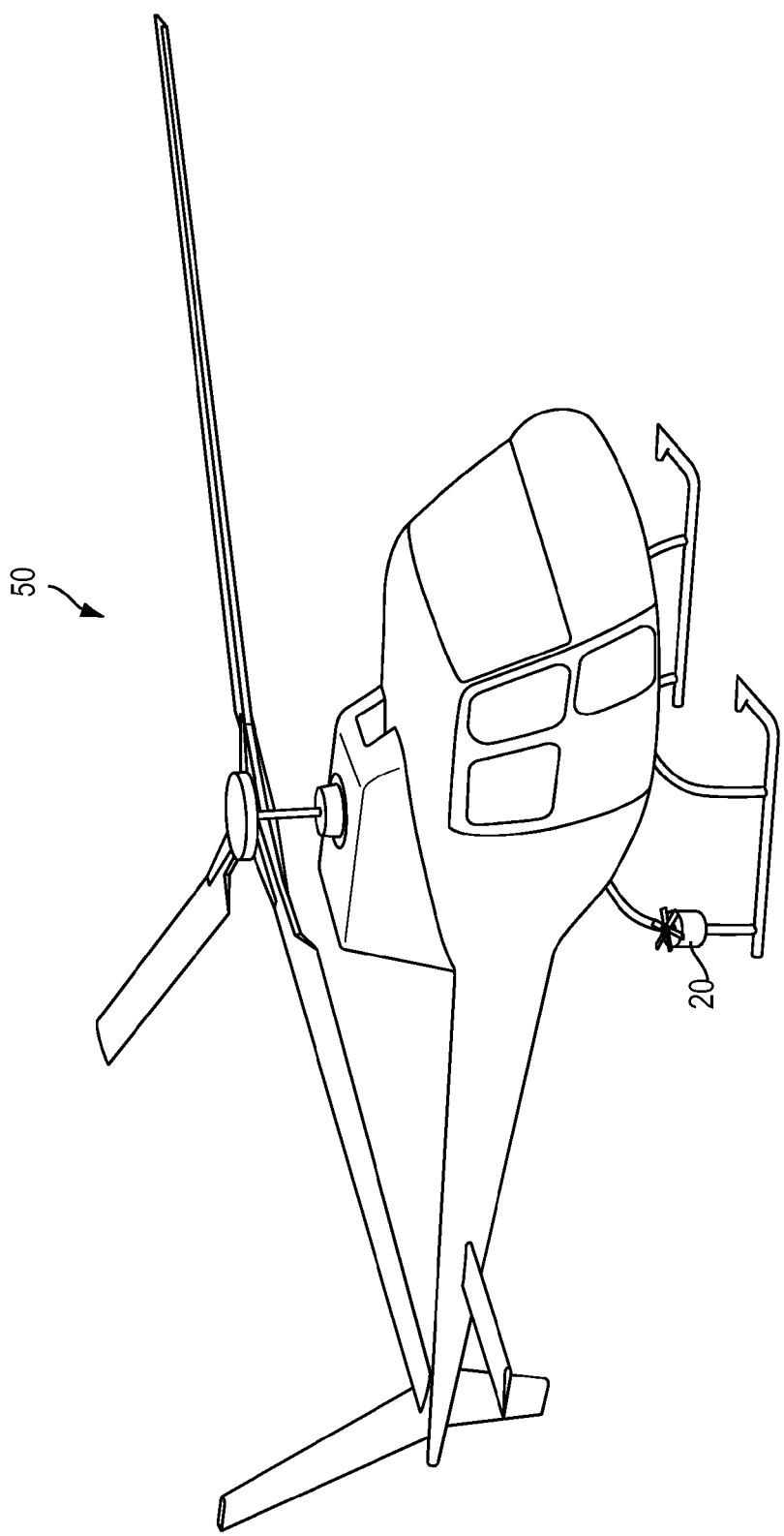
FIG. 5 is a perspective view of a helicopter including the power generator system of the present invention.

Referring to FIG. 5, according to an embodiment of the present invention, a helicopter 50 including the air power generator system 20 of the present invention can be provided. The helicopter 50 may include one or more power generators 20 of the present invention, and may be located on at least one leg of the helicopter and may be installed vertically such that the fan 22 faces upward a rotor of the helicopter 50 to be rotated by wind produced by the rotor. Preferably, the helicopter 50 may have four power generator systems 20 installed on the front and rear portions of left and right legs of the helicopter 50. Since the helicopter 50 can generate strong wind when the rotor runs although the helicopter is stationed, the power generator system 20 can be very useful to generate electricity to supply it to the helicopter and to operate many electrical devices installed in it or save the generated electricity to a battery for later uses. For example, a helicopter uses a battery with high capacity, 25 Amp Hours, which can be charged by electricity generated by the present power generator system 20.

Figure 6:
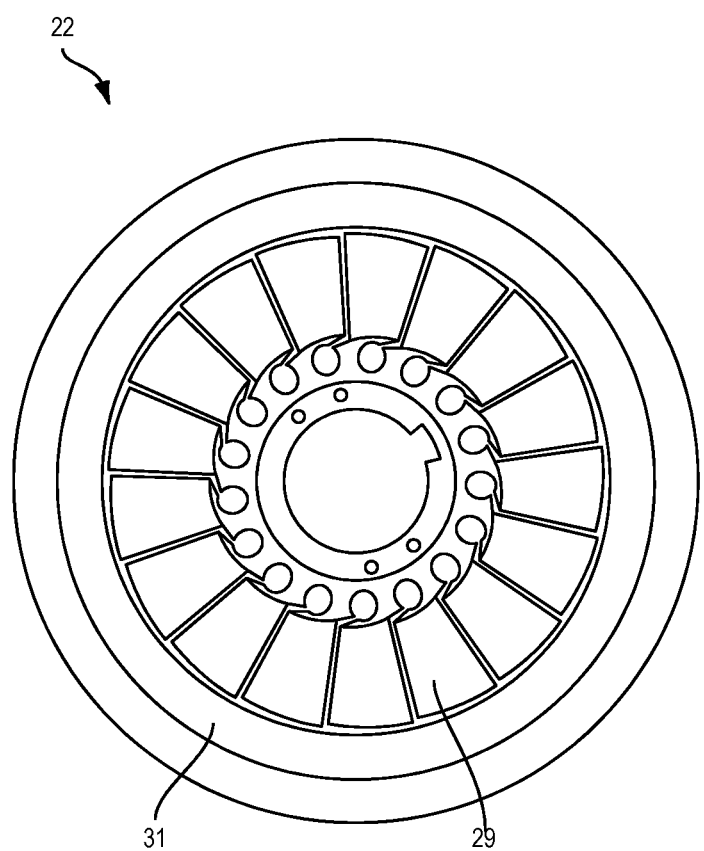
FIG. 6 is a top perspective view of another embodiment of the wind fan of the power generator system of the present invention.

Referring to FIG. 6, another embodiment of the wind fan 22 of the power generator system 20 is provided. This embodiment of the wind fan 22 may include a plurality of blades 29 arranged in a circular shape. The inner ends of the plurality of blades 29 are connected to an inner shaft with a hole at the center for receiving a cylindrical shaft, and the outer ends of the plurality of blades 29 are connected to a circular cover frame 31 that is disposed around the plurality of blades 29 and is configured to protect the plurality of blades 29.

Figure 7:
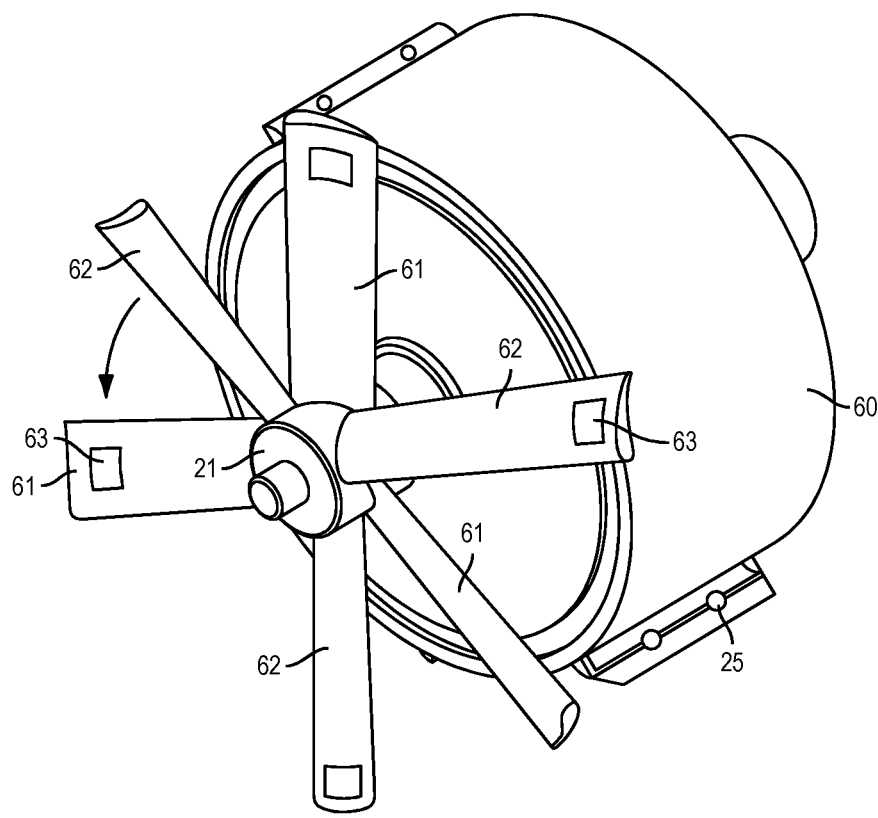
FIG. 7 is another embodiment of the power generator of FIG. 2.

FIG. 7 shows another embodiment of the power generator 23 of FIG. 2. The power generator 60 of FIG. 7 is substantially similar to the power generator 23 of FIG. 2, having a different feature that the fan blades 61, 62 have a different arrangement. For example, as shown in FIG. 7, the power generator 60 may have six fan blades 61, 62 connected to the shaft 21 for driving the power generator 60, and three 61 of the six fan blades 61, 62 can be arranged and configured to be rotated by wind power to rotate the power generator 60, and other three 62 of the six fan blades 61, 62 can be configured and arranged to blow wind toward the power generator 60 so as to cool the power generator 60. As such, the fan blades 61, 62 can be used for driving the power generator 60 and for cooling the power generator 60 as well. Further, the shaft 21 can be further extended forward and have a gear, a pulley, a crankshaft, or an eccentric shaft to engage with another driving shaft of one or more wheels of the moving or non-moving objects. Further, the fan blades 61, 62 can be substituted for a wind turbine which may have similar features as the fan blades 61, 62 as described above.

Further, as shown in FIG. 7, one or more of the fan blades 61, 62 may have a replaceable weight adjuster 63 located at one end of the one or more of the fan blades 61, 62 for controlling the power generator system to increase the produced power, and thus the replaceable weight adjuster 63 is detachable. However, in another embodiment of the power generator 60, the weight adjuster 63 can be fixed to the fan blades 61, 62.

The replaceable weight adjuster 63 may be in different shapes and sizes having different weights in accordance with the size of the fan blades 61, 62, and may be attached onto the front or rear side of the fan blades 61, 62. Preferably, the replaceable weight adjuster 63 is attached on the rear end portion of the fan blades 61, 62 to enhance the rotation of the fan blades 61, 62 such that more horse power of electricity can be generated.

Figure 8:
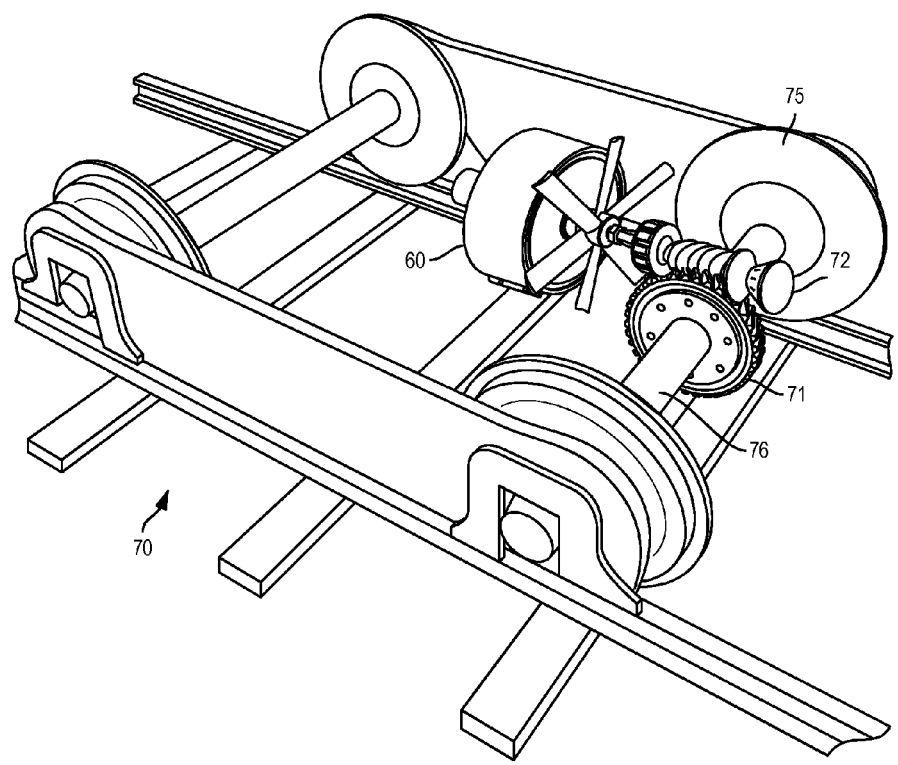
FIG. 8 is an exemplary embodiment of the power generator system of the present invention applied to a train chassis.

FIG. 8 shows a power generating system 70 using wasting energy from a moving object. The moving object may include, but not limited to, trains, airplanes, automobiles, vehicles, helicopters, ships, submarines, and the like. As an exemplary embodiment, FIG. 8 shows the power generating system 70 of the present invention utilizing the wasting mechanical energy of wheels 75 of a train to produce high voltage of electricity, installed in the lower train chassis.

The power generating system 70 as shown in FIG. 8 may include at least one power generator 60 connected to a rotating shaft of a worm 72 of a worm gear engaging a worm wheel 71 of the worm gear. The worm wheel 71 is attached to a shaft 76 of the wheels 75 of the train. When the wheels 75 rotate, the worm gear engages with the shaft 21 of the power generator 60 through the rotating shaft of the worm 72 such that the power generator 60 can generate electrical power. As such, the worm 72 connected to the shaft 21 of the power generator 60 and the worm wheel 71 directly engaged with each other. Since a plurality of the power generator 60 can be installed in the lower train chassis adjacent to the wheels 75, a high amount of electricity can be generated by this system for use in the train or outside the train when supplied to a power grid through a pantograph of the train.

Instead of the worm 72, the shaft 21 of the power generator 60 may have a pulley, a crankshaft, an eccentric shaft or the like for engaging with the shaft 76 of the wheels 75 such that the shaft 76 of the wheels 75 may have a corresponding pulley, crankshaft, eccentric shaft or the like. In another embodiment of the present invention, the worm gear can be replaced with one of a bevel gear, a helical gear, or a spur gear. For example, the wheels 75 can have gear teeth on the inner side of the wheels that can engage with part of a bevel gear. In other words, the wheels 75 can be part of the bevel gear to transfer the power to another shaft having gear teeth engaging with the teeth of the wheels 75 and being connected with the shaft 21 of the power generator 60.

The power generating system 70 may be installed in or outside of a body of the moving object or the rotating machine, and may produce power by the power generator 60 rotated by the rotating shaft 21 using the wasting mechanical energy from the moving object or rotating machine when the moving object or the rotating machine is operated, and the produced power can be for at least one of recharging a battery, operating the moving object or the rotating machine, and transmitting the power to the grid. The power generating system 70 is configured to adjust a RPM of the rotating shaft 21 by a diameter or a size of the gear, the wheel, or the pulley.

Further, the power generating system 70 can include an output power jack configured to be connected to the grid, which is similar to the output jack 41 of FIG. 4. Also, the power generating system 70 can include one of a voltage regulator, a transformer, or a rectifier, similar to the DC/AC converter 27 as shown in FIG. 2.

Figure 9:
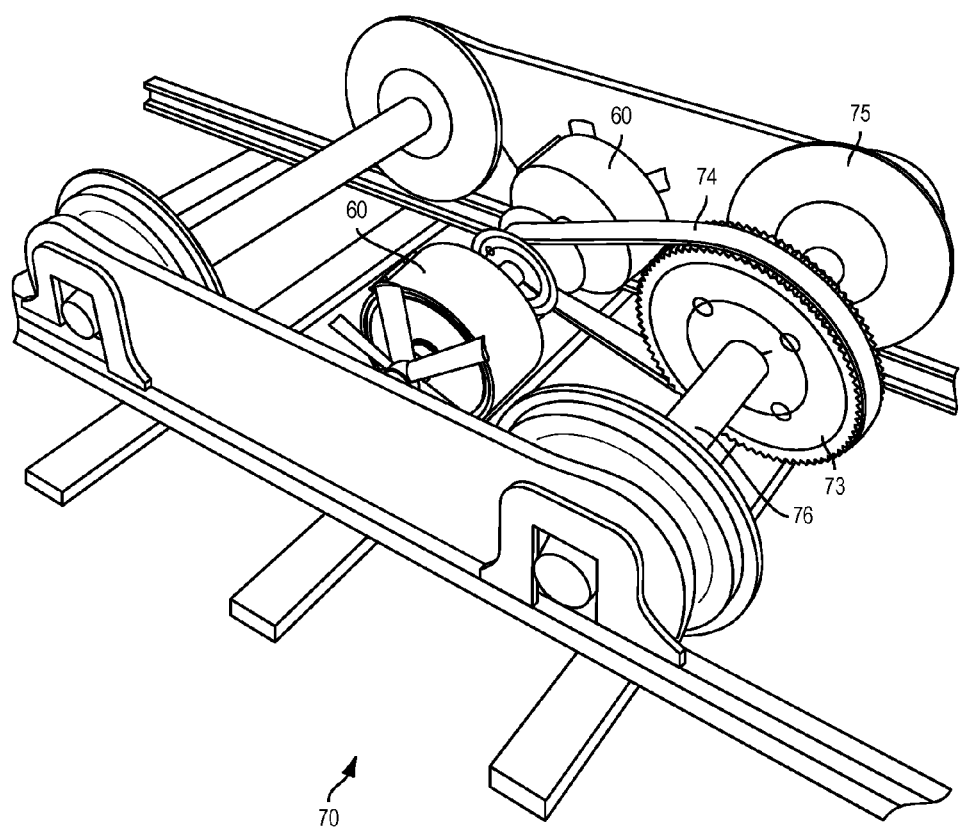
FIG. 9 is another exemplary embodiment of the power generator system of the present invention applied to the train chassis.

FIG. 9 shows another embodiment of the power generating system 70 applied to the train. 7. As shown in FIG. 9, the power generating system 70 can include a pulley 73 attached on the shaft 76 of the wheels 75. The pulley 73 can be also a chain gear 73 with teeth. The power generating system 70 further can include a plurality of power generators 60. For example, two power generators 60 can be installed in the train chassis with one shaft 76 of the wheels 75 such that the two power generators 60 can be driven by one shaft 21 having another pulley or chain gear which is engaged with the pulley 73 or chain gear 73 of the shaft 76 through a belt 74 or a chain 74. As such, the power generators 60 have the fan blades 61, 62 facing the side direction of the train. However, the location and direction of the power generators 60 are not limited to the ones shown in FIG. 9, but they can be modified by one of ordinary skill in the art in accordance with the scope of the present invention. If there is a need for the power generator 60 to be installed such a way facing the front direction of the train, another shaft and gear mechanism can be added between the shaft 21 of the generator 60 and the shaft 76 of the wheels 75 with obvious modifications and improvements of the present disclosure by one of ordinary skill in the art.

The wheels 75 can be a metal wheel, an automobile tire wheel, a plastic wheel or a bearing wheel of any kind of moving objects and machines. In another embodiment of the present invention, the power generator 60 can have one of a vertical rotating fan or a horizontal rotating fan attached to the rotating shaft 21 and configured to cool the power generator 60 or rotate it for producing power. Minor modifications with respect to the arrangement of the power generator 60 in the train chassis is within the scope of the present invention.

Figure 10:
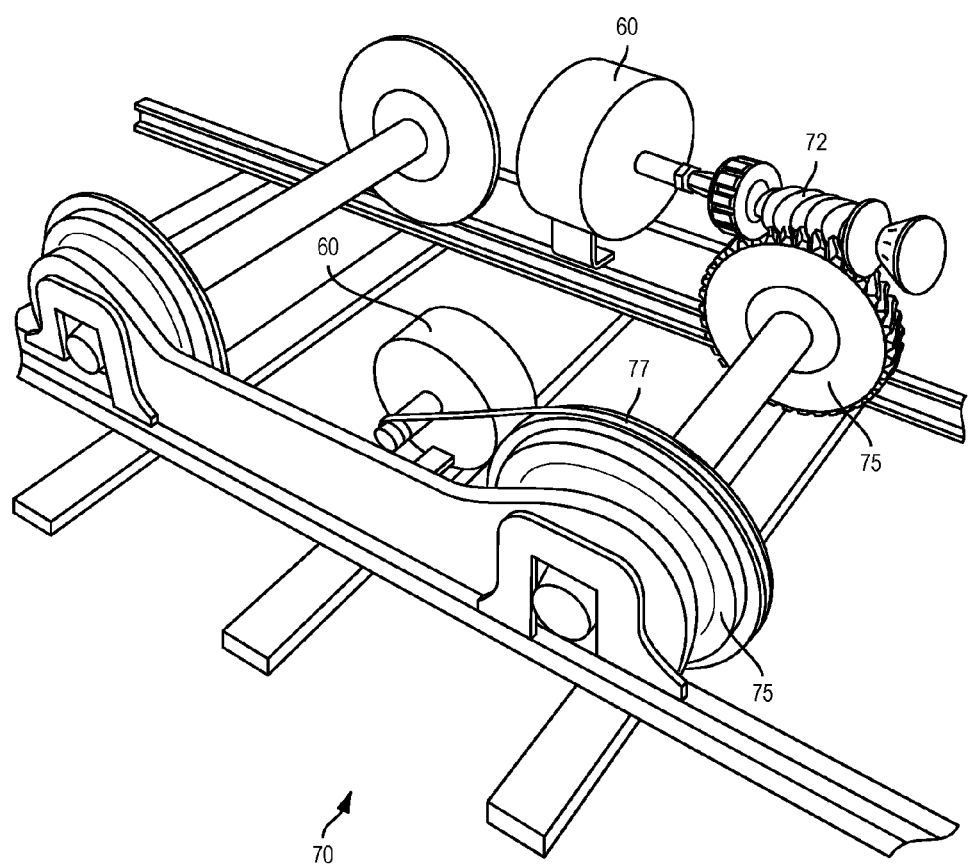
FIG. 10 is another exemplary embodiment of the power generator system of the present invention applied to the train chassis.

FIG. 10 shows another exemplary embodiment of the power generating system 70 of the present invention applied to a train or a trailer. In this embodiment, the wheel 75 can have gear teeth on the outer circumference which engage with the worm 72 for rotating the power generator 60. The wheel 75 has a circumferential surface in a smaller diameter which is in contact with the rails for the train, and also another outmost circumferential surface in a larger diameter as a guide which is for preventing the derail of the wheels as shown in FIG. 10. Since the outmost circumferential surface of the wheel 75 is not in contact with the train rails, the wheel 75 can have the gear teeth thereon for engaging with the worm 72 such that the wheel 75 and the worm 72 can constitute a worm gear. Also, a spur gear and the like can be used instead of the worm gear to rotate the generator 60.

Further, as shown in FIG. 10, the wheel 75 can have a groove on the circumferential surface of the wheel 75 for a belt 77 connected with the power generator 60 for rotating it. As such, the power generator 60 has the shaft 21 provided with a groove to receive the belt 77. The power generator 60 may not have fan blades 61, 52 as in this embodiment when the power generator 60 is rotated by only mechanical power. The power generator 60 can be fixed to the frame of the lower chassis of the train using different shapes of brackets. However, the arrangement of the location and direction of the power generator 60 and a method of fixing the power generator 60 to the frame would be in the ordinary skill in the art, not limited to the specific location, direction and method as shown in the figures.

There could be many applications of the power generating system 70 of the present invention. As an example, the power generating system 70 can be incorporated into an electric powered train to produce a high amount of electricity to supply it not only to the train to drive it but to the grid. Also, a power plant can be made, including a train having the power generating system 70 of the present invention running in a circular rail at a speed of about 40 miles per hour such that the train can produce electricity to supply it to the grid. The power generating system 70 may be also used for trains in amusement parks.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A power generating system comprising:
a plurality of wheels of one of a train and a trailer, wherein at least one wheel has a first circumferential surface in contact with a train rail, and a second circumferential surface which has a first plurality of gear teeth thereon; and
at least one power generator for generating power and connected to a rotating shaft having a second plurality of gear teeth configured to engage with the first plurality of gear teeth of the at least one wheel,
wherein the at least one power generator is located adjacent to the at least one wheel.

2. The power generating system of claim 1, wherein the at least one power generator includes a center shaft and one or more fan blades connected to the center shaft for cooling the at least one power generator.

3. The power generating system of claim 2, wherein at least one of the one or more fan blades includes a replaceable weight adjuster attached at one end of the at least one of the one or more fan blades to increase the centrifugal force of the at least one fan blade.

4. The power generating system of claim 2, wherein the rotating shaft of the second plurality of gear teeth includes a jointer configured to connect the rotating shaft to the center shaft of the generator.

5. The power generating system of claim 1, further comprising an output power jack configured to be connected to the grid.

6. The power generating system of claim 1, further comprising one of a voltage regulator, a transformer, or a rectifier.

7. A power generating system comprising:
a plurality of wheels of one of a train and a trailer, wherein at least one wheel has a first circumferential surface in contact with a train rail, and a second circumferential surface which has a groove thereon; and
at least one power generator for generating power and connected to a rotating shaft having another groove for engaging with a belt configured to engage with the groove of the at least one wheel,
wherein the at least one power generator is located adjacent to the at least one wheel.

8. The power generating system of claim 7, wherein the at least one power generator includes a center shaft and one or more fan blades connected to the center shaft for cooling the at least one power generator.

9. The power generating system of claim 8, wherein at least one of the one or more fan blades includes a replaceable weight adjuster attached at one end of the at least one of the one or more fan blades to increase the centrifugal force of the at least one fan blade.

10. The power generating system of claim 8, wherein the rotating shaft of the worm includes a jointer configured to connect the rotating shaft to the center shaft of the generator.

11. The power generating system of claim 7, further comprising an output power jack configured to be connected to the grid.

12. The power generating system of claim 7, further comprising one of a voltage regulator, a transformer, or a rectifier.

\* \* \* \* \*